(12) United States Patent
Shen et al.

(10) Patent No.: US 12,299,517 B2
(45) Date of Patent: May 13, 2025

(54) COMMUNICATION TAG AND ELECTRONIC DEVICE

(71) Applicant: HUAWEI TECHNOLOGIES CO., LTD., Guangdong (CN)

(72) Inventors: Yunpeng Shen, Wuhan (CN); Jiahui Chu, Shanghai (CN); Tengfei Huang, Wuhan (CN); Bo Jiang, Dongguan (CN); Xuming Chen, Wuhan (CN); Jing Zhao, Wuhan (CN)

(73) Assignee: Huawei Technologies Co., Ltd. (CN)

( * ) Notice: Subject to any disclaimer, the term of this patent is extended or adjusted under 35 U.S.C. 154(b) by 0 days.

(21) Appl. No.: 18/695,334

(22) PCT Filed: Aug. 25, 2022

(86) PCT No.: PCT/CN2022/114688
§ 371 (c)(1),
(2) Date: Mar. 25, 2024

(87) PCT Pub. No.: WO2023/051115
PCT Pub. Date: Apr. 6, 2023

(65) Prior Publication Data
US 2025/0005316 A1    Jan. 2, 2025

(30) Foreign Application Priority Data
Sep. 28, 2021 (CN) .......................... 202111145814.0

(51) Int. Cl.
*G06K 19/077* (2006.01)
(52) U.S. Cl.
CPC ... *G06K 19/07784* (2013.01); *G06K 19/0772* (2013.01); *G06K 19/07779* (2013.01)

(58) Field of Classification Search
CPC ......... G06K 19/07784; G06K 19/0772; G06K 19/07779
See application file for complete search history.

(56) References Cited

U.S. PATENT DOCUMENTS

| 5,495,250 A * | 2/1996 | Ghaem ................... H01M 6/40 342/51 |
| 11,017,284 B2 * | 5/2021 | Eshima ..................... H01Q 1/40 |
| 2010/0071746 A1 * | 3/2010 | Furumura ................ G07D 7/01 136/244 |

(Continued)

FOREIGN PATENT DOCUMENTS

| EP | 4053742 A1 | 9/2022 | |
| WO | WO-2018101315 A1 * | 6/2018 | ............. G06K 19/02 |
| WO | 2021085269 A1 | 5/2021 | |

OTHER PUBLICATIONS

Extended European Search Report in European Appln. No. 22874507.1, mailed on Nov. 14, 2024, 8 pages.

*Primary Examiner* — Tuyen K Vo
(74) *Attorney, Agent, or Firm* — Fish & Richardson P.C.

(57) ABSTRACT

The present disclosure relates to communication tags and electronic devices. One example communication tag includes a circuit board and a chip disposed on the circuit board. Two coils are formed on the circuit board. The two coils are respectively disposed on two different conducting layers of the circuit board. Optionally, the two coils are disposed in an intersecting manner. In addition, lines for feeding the two coils are disposed close to each other.

20 Claims, 6 Drawing Sheets

(56) References Cited

U.S. PATENT DOCUMENTS

| | | | | |
|---|---|---|---|---|
| 2012/0086556 A1* | 4/2012 | Ikemoto | ........... | G06K 19/07779 |
| | | | | 235/492 |
| 2015/0236418 A1* | 8/2015 | Ito | ........................ | H01Q 1/38 |
| | | | | 343/788 |
| 2018/0137399 A1* | 5/2018 | Kato | ................ | G06K 19/07771 |
| 2019/0266467 A1* | 8/2019 | Kato | ................ | G06K 19/07773 |
| 2021/0125017 A1* | 4/2021 | Kato | .................. | G06K 19/0701 |
| 2022/0405541 A1* | 12/2022 | Yamamoto | ....... | G06K 19/07722 |

\* cited by examiner

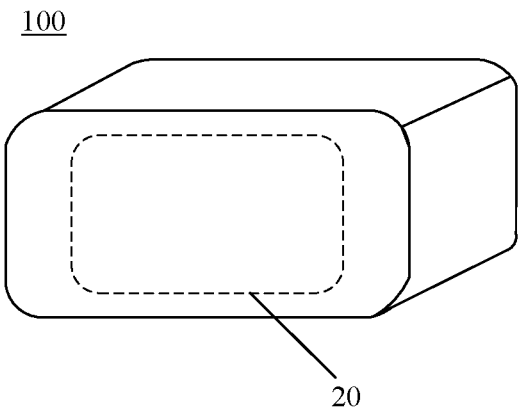
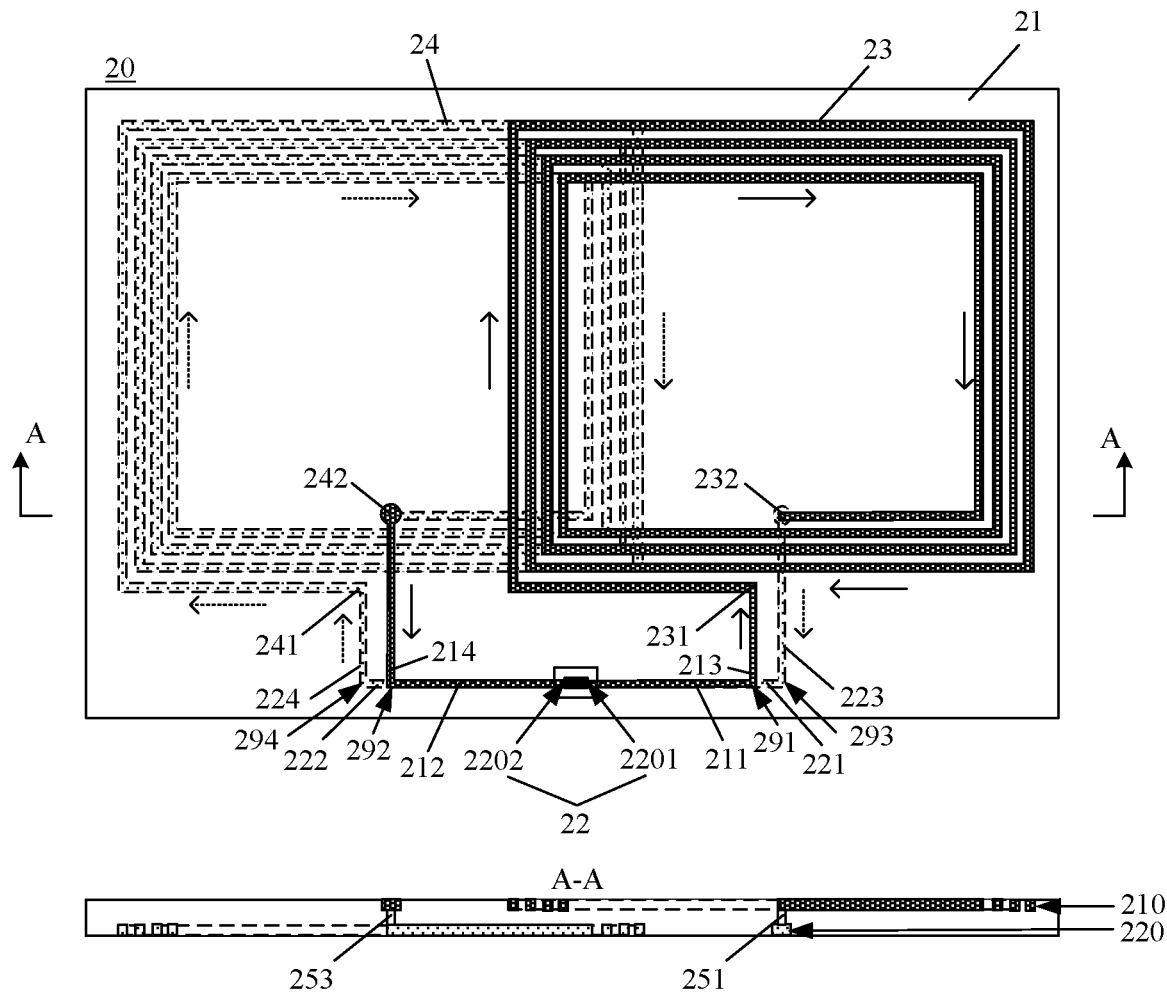
FIG. 2

COMMUNICATION TAG AND ELECTRONIC DEVICE

CROSS-REFERENCE TO RELATED APPLICATION

This application is a National Stage of International Application No. PCT/CN2022/114688, filed on Aug. 25, 2022, which claims priority to Chinese Patent Application No. 202111145814.0, filed on Sep. 28, 2021. Both of the aforementioned applications are hereby incorporated by reference in their entireties.

TECHNICAL FIELD

This application relates to the field of electronic devices, and more specifically, to a communication tag and an electronic device.

BACKGROUND

Electronic devices are close to each other, to implement short-haul communication interaction between a plurality of electronic devices. Near field communication (near field communication, NFC) is a common short-haul communication manner. NFC interaction is used as an example. An electronic device may have a coil configured to radiate an NFC signal. The electronic device may perform NFC interaction with another electronic device by using the coil. How to improve performance of the electronic device in sensing a short-haul communication signal is a problem to be resolved in this application.

SUMMARY

This application provides a communication tag and an electronic device, to improve performance of the communication tag and the electronic device in sensing a short-haul communication signal.

According to a first aspect, a communication tag is provided, including:
- a circuit board, where the circuit board includes a first coil and a second coil, the first coil and the second coil are located on different conducting layers on the circuit board, and a current on the first coil and a current on the second coil have a same direction; and
- a chip, where the chip is disposed on the circuit board, the chip includes a first port and a second port, and polarities of the first port and the second port are opposite.

The circuit board includes a first conducting layer and a second conducting layer. The chip, the first conducting layer, and the second conducting layer form a coil feeding circuit.

The coil feeding circuit includes a first feeding end, a second feeding end, a third feeding end, and a fourth feeding end.

The first feeding end is located at the first conducting layer, and is electrically connected to the first port.

The second feeding end is located at the first conducting layer, and is electrically connected to the second port.

The third feeding end is located at the second conducting layer, and is disposed opposite to the first feeding end. The third feeding end is electrically connected to the second port.

The fourth feeding end is located at the second conducting layer, and is disposed opposite to the second feeding end. The fourth feeding end is electrically connected to the first port.

The first coil is electrically connected between the first feeding end and the third feeding end. The second coil is electrically connected between the second feeding end and the fourth feeding end.

The coil feeding circuit may be configured to feed the first coil and the second coil. Because the communication tag may include two coils, signal strength, a sensing area, and the like of the communication tag may be correspondingly increased. Proper wiring is performed on the circuit board, so that the first coil and the second coil can share a same port of the chip. The coil feeding circuit may form two 180° reverse differential ports on two sides of the chip, to help reduce signal interference of the feeding circuit to the first coil and the second coil when feeding the first coil and the second coil.

With reference to the first aspect, in some implementations of the first aspect, the coil feeding circuit further includes a first through hole and a second through hole.

The first through hole is electrically connected between the second feeding end on the first conducting layer and the third feeding end on the second conducting layer.

The second through hole is electrically connected between the first feeding end on the first conducting layer and the fourth feeding end on the second conducting layer.

The first conducting layer and the second conducting layer may be electrically connected by using the through hole, to help dispose the reverse differential ports close to each other, and help reduce the signal interference of the feeding circuit to the first coil and the second coil.

With reference to the first aspect, in some implementations of the first aspect, the coil feeding circuit includes a first line. The first line is located at the first conducting layer. The first line is electrically connected between the first port and the first feeding end.

The coil feeding circuit further includes a second line. The second line is located at the first conducting layer. The second line is electrically connected between the second port and the second feeding end.

The coil feeding circuit further includes a third line. The third line is located at the second conducting layer. The third line is disposed opposite to the first line. The third line is electrically connected between the first through hole and the third feeding end. The third line and the second port are electrically connected to the second line by using the first through hole.

The coil feeding circuit further includes a fourth line. The fourth line is located at the second conducting layer. The fourth line is disposed opposite to the second line. The fourth line is electrically connected between the second through hole and the fourth feeding end. The fourth line and the first port are electrically connected to the first line by using the second through hole.

A current direction of the first line may be approximately opposite to a current direction of the third line, and a current direction of the second line may be approximately opposite to a current direction of the fourth line. Therefore, the first line is disposed close to the third line, and the second line is disposed close to the fourth line, so that a magnetic field generated by the fourth line may be used to counteract a part of a magnetic field generated by the second line, and a magnetic field generated by the first line may be used to counteract a part of a magnetic field generated by the third line. This helps reduce impact of a feeding line of a coil on a magnetic field generated by the coil.

With reference to the first aspect, in some implementations of the first aspect, the third line and the fourth line are located on the two sides of the chip. The first through hole is located on a side that is of the chip and that is close to the third line. The second through hole is located on a side that is of the chip and that is close to the fourth line.

The first line includes a first part. The first part of the first line is disposed opposite to the third line. The second line includes a first part. The first part of the second line is disposed opposite to the fourth line.

The first line further includes a second part and a third part. One end of the second part of the first line is connected to the second through hole. Around the first through hole, the third part of the first line is connected between the first part and the second part of the first line.

The second line further includes a second part and a third part. One end of the second part of the second line is connected to the first through hole. Around the second through hole, the third part of the second line is connected between the first part and the second part of the second line.

A spacing between the second part of the first line and the second part of the second line is less than a preset spacing.

A current direction of the first part of the first line may be approximately opposite to a current direction of the second part of the second line. Therefore, the first part of the first line is disposed close to the second part of the second line, so that a magnetic field generated by the first part of the first line may be used to counteract a part of a magnetic field generated by the second part of the second line. This helps reduce impact of a feeding line of a coil on a magnetic field generated by the coil.

With reference to the first aspect, in some implementations of the first aspect, the first port of the chip is located between the second part and the third part of the first line. The second port of the chip is located between the second part and the third part of the second line.

The first port and the second port of the chip may be located at two ends of the chip. A connection line direction of the first port and the second port may be set perpendicular to the first line or the second line. The chip may cross space between the first line and the second line. This helps reduce lines from the port of the chip to the lines disposed close to each other.

With reference to the first aspect, in some implementations of the first aspect, the first line and the second line are located on the two sides of the chip. The first through hole is located on a side that is of the chip and that is close to the second line. The second through hole is located on a side that is of the chip and that is close to the first line.

The third line includes a first part. The first part of the third line is disposed opposite to the first line. The fourth line includes a first part. The first part of the fourth line is disposed opposite to the second line.

The third line further includes a second part and a third part. One end of the second part of the third line is connected to the first through hole. The second part of the third line is disposed opposite to the first line or the second line. Around the second through hole, the third part of the third line is connected between the first part and the second part of the third line.

The fourth line further includes a second part and a third part. One end of the second part of the fourth line is connected to the second through hole. The second part of the fourth line is disposed opposite to the first line or the second line. Around the first through hole, the third part of the fourth line is connected between the first part and the second part of the fourth line.

A current direction of the second part of the third line may be approximately opposite to the current direction of the first line or the second line, and a current direction of the second part of the fourth line may be approximately opposite to the current direction of the first line or the second line. Therefore, the second part of the third line is disposed close to the first line or the second line, and the second part of the fourth line is disposed close to the first line or the second line, so that a magnetic field generated by the second part of the third line may be used to counteract a part of the magnetic field generated by the first line or the second line. This helps reduce impact of a feeding line of a coil on a magnetic field generated by the coil.

With reference to the first aspect, in some implementations of the first aspect, the first port of the chip is connected to one end of the first line. The second port of the chip is connected to one end of the second line.

The first port and the second port of the chip may be located at the two ends of the chip. The connection line direction of the first port and the second port may be set parallel to the first line or the second line. The chip may cross the space between two ends that are close to each other and that are of the first line and the second line. This helps reduce a length of the first line and the second line.

With reference to the first aspect, in some implementations of the first aspect, the first conducting layer further includes a fifth line electrically connected between the first feeding end and a first end of the first coil. The second conducting layer further includes a sixth line electrically connected between the third feeding end and a second end of the first coil. The fifth line is disposed opposite to the sixth line.

A current direction of the fifth line may be approximately opposite to a current direction of the sixth line. Therefore, the fifth line is disposed close to the sixth line, so that a magnetic field generated by the fifth line may counteract a magnetic field generated by the sixth line as much as possible. This helps reduce impact of a feeding line of a coil on a magnetic field generated by the coil.

With reference to the first aspect, in some implementations of the first aspect, the first conducting layer further includes a seventh line electrically connected between the second feeding end and a first end of the second coil. The second conducting layer further includes an eighth line electrically connected between the fourth feeding end and a second end of the second coil. The seventh line is disposed opposite to the eighth line.

A current direction of the seventh line may be approximately opposite to a current direction of the eighth line. Therefore, the seventh line is disposed close to the eighth line, so that a magnetic field generated by the seventh line may counteract a magnetic field generated by the eighth line as much as possible. This helps reduce impact of a feeding line of a coil on a magnetic field generated by the coil.

With reference to the first aspect, in some implementations of the first aspect, the first coil and the second coil are disposed in an intersecting manner.

An area enclosed by the first coil and the second coil may be an effective sensing region of the communication tag. In the effective sensing region of the communication tag, directions of magnetic fields generated by the communication tag may be relatively consistent, and magnetic fluxes of the magnetic fields generated by the communication tag may be relatively large. Therefore, the communication tag can meet a communication requirement for short-haul communication. For a specific short-haul communication frequency band, a length of a coil is usually relatively fixed. When the communication requirement is met, a sensing area that can be implemented by a single coil is relatively small. The communication tag provided in this application may reach, within more offset distances, a coupling factor that meets a requirement. An amplitude of an induced magnetic field of the communication tag may be relatively high when an area of the effective sensing region of the communication tag is increased. Therefore, in the solution provided in this embodiment of this application, both the sensing area and the amplitude of the induced magnetic field of the communication tag can be considered.

For example, the sensing area of the communication tag may be relatively large, and an amplitude of the magnetic flux is high. Therefore, when a user puts another device close to any effective sensing region of the communication tag, the another device may quickly complete pairing with the communication tag, or the another device may quickly complete pairing with an electronic device having the communication tag. This helps improve convenience of using the communication tag by the user.

With reference to the first aspect, in some implementations of the first aspect, the first coil is located on the first conducting layer. The second coil is located on the second conducting layer. A part of projection that is of the first coil and that is on the second conducting layer is located in an area enclosed by the second coil.

The first coil and the second coil have an appropriate degree of intersection. This helps improve sensing performance of a central region of the effective sensing region formed by the first coil and the second coil, and helps quickly implement pairing when the user approaches the central region of the communication tag.

With reference to the first aspect, in some implementations of the first aspect, the first coil is located on the first conducting layer. The second coil is located on the second conducting layer. The first coil and the second coil do not intersect each other.

The circuit board further includes a third conducting layer. The third conducting layer includes a third coil. The third coil and the first coil are disposed in an intersecting manner. The third coil and the second coil are disposed in an intersecting manner. The communication tag further includes:

a capacitive device, where a first port of the capacitive device is electrically connected to a first end of the third coil, and a second port of the capacitive device is electrically connected to a second end of the third coil.

The first coil and the second coil may form a magnetic field in a first direction. In a spacing region between the first coil and the second coil, both the first coil and the second coil may form a magnetic field in a second direction that is opposite to the first direction. A magnetic field in the spacing region between the first coil and the second coil may be used. The third coil that intersects both the first coil and the second coil is disposed, so that the magnetic field in the second direction formed between the first coil and the second coil can enable the third coil to induce the magnetic field in the first direction. Therefore, the effective sensing region of the communication tag may include a sensing region of the first coil, a sensing region of the second coil, and a sensing region between the first coil and the second coil. Therefore, an effective sensing area of the communication tag may be greater than a sum of an effective sensing area of the first coil and an effective sensing area of the second coil. The communication tag provided in this application may have a relatively large sensing area, and a magnetic flux of a magnetic field radiated by the communication tag may be relatively good. Therefore, in the solution provided in this embodiment of this application, both the sensing area and the amplitude of the induced magnetic field of the communication tag can be considered. This helps improve performance of the communication tag in sensing a short-haul communication signal.

With reference to the first aspect, in some implementations of the first aspect, a first part of projection that is of the third coil and that is on the first conducting layer is located in an area enclosed by the first coil. A second part of projection that is of the third coil and that is on the second conducting layer is located in the area enclosed by the second coil.

The first coil and the third coil have an appropriate degree of intersection, and the second coil and the third coil have an appropriate degree of intersection. This helps improve sensing performance of an effective sensing region formed by the third coil, and helps quickly implement pairing when the user approaches the communication tag.

With reference to the first aspect, in some implementations of the first aspect, the chip and the capacitive device are disposed on a same side of the third conducting layer.

Properly arranging positions of the chip and the capacitive device helps improve flexibility of wiring on the circuit board.

With reference to the first aspect, in some implementations of the first aspect, projection that is of the chip and that is on the circuit board is located outside the first coil and the second coil.

Disposing the chip away from the first coil and the second coil helps reduce interference of a signal generated by the coil feeding circuit to a signal generated by the first coil and the second coil.

According to a second aspect, an electronic device is provided, including the communication tag according to any possible implementation of the first aspect.

BRIEF DESCRIPTION OF DRAWINGS

FIG. 1 is a schematic diagram of a structure of an electronic device according to this application;

FIG. 2 is a schematic diagram of a structure of a communication tag according to this application;

DESCRIPTION OF EMBODIMENTS

Figure 3:
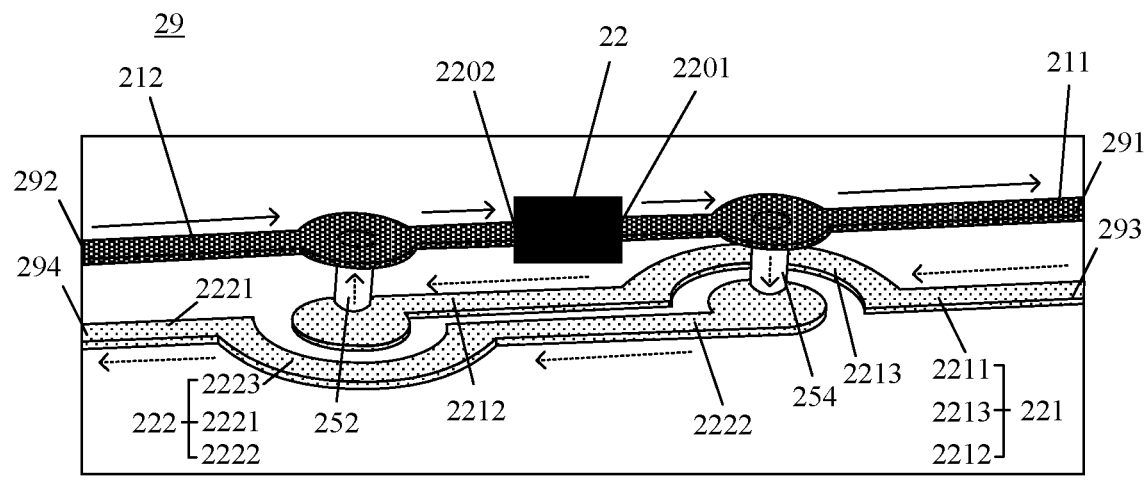
FIG. 3 is a schematic diagram of a structure of a balun according to this application.

The following describes technical solutions of this application with reference to accompanying drawings.

FIG. 1 is a schematic diagram of a structure of an electronic device 100 according to an embodiment of this application. The electronic device 100 may be a device that includes a radio frequency function, such as a mobile phone, a tablet computer, an e-reader, a television, a notebook computer, a digital camera, a speaker, a headset, a watch, a vehicle-mounted device, a wearable device, a server, a storage device, or a data center. For example, the storage device may be a hard disk drive or the like having the radio frequency function. In the embodiment shown in FIG. 1, an example in which the electronic device 100 is the storage device is used for description. As shown in FIG. 1, the electronic device 100 may have a short-haul communication tag 20. The short-haul communication tag 20 may also be referred to as a card reader. In an example, the short-haul communication tag 20 may be, for example, an NFC tag or an NFC card reader.

The following describes a principle of short-haul communication by using an example. A device A may include a tag A used for the short-haul communication. A device B may include a tag B used for the short-haul communication. When the tag A and the tag B are sufficiently close to each other, the tag A may sense a relatively large magnetic flux of a magnetic field radiated by the tag B, and generate an induced current. Therefore, the device A may sense a short-haul communication signal from the device B.

The two devices may exchange information through the short-haul communication. For example, both a terminal device (for example, an electronic device such as a mobile phone, a computer, a speaker, a headset, or a watch) and a storage device may have a short-haul communication tag, so that both the terminal device and the storage device may have a short-haul communication function. When the short-haul communication tag of the terminal device approaches or touches the short-haul communication tag of the storage device, the terminal device and the storage device may exchange information through a short-haul communication protocol. The terminal device may obtain related information of the storage device, and complete pairing between the terminal device and the storage device.

Optionally, the storage device may allow the terminal device to read and write the storage device. Therefore, the terminal device may read and/or write a memory in the storage device.

For example, the terminal device may display a control interface for the storage device. A user may control the storage device by using the control interface. For example, the control interface may display a file stored in the storage device. Through a series of operations on the control interface, the storage device may send data stored in the storage device to the terminal device.

For another example, the terminal device may display a data backup interface of the terminal device. The user may back up data stored in the terminal device to the storage device by using the data backup interface. For example, the data backup interface may display a file stored in the terminal device. Through a series of operations on the data backup interface, the terminal device may send to-be-backed up data to the storage device.

In some possible scenarios, a plurality of devices may interact with each other in a plurality of communication manners including the short-haul communication. For example, the terminal device may further establish a communication connection to a gateway device by using a communication protocol such as a wireless local area network (wireless local area network, WLAN) or Bluetooth. Similarly, the storage device may establish a communication connection to the gateway device.

For example, when the terminal device backs up data to the storage device, the terminal device may send the to-be-backed up data to the storage device by using the gateway device. For another example, when the terminal device reads data from the storage device, the storage device may send the data stored in the storage device to the terminal device by using the gateway device.

The short-haul communication tag may include a coil. When a magnetic field from the outside passes through the coil, the coil may generate an induced current. Sensing performance of the coil is closely related to sensing performance of the short-haul communication tag. Generally, a larger sensing area of the coil indicates that the short-haul communication tag is more likely to approach a short-haul communication tag of another device. A larger quantity of turns of the coil indicates that the coil is more likely to generate a stable induced current with a large amplitude, and a magnetic flux radiated by the coil may be relatively large. This further helps the short-haul communication tag to implement relatively stable short-haul communication.

However, for a short-haul communication tag of a specific operating frequency band, a length of the coil may be relatively fixed. If the sensing area of the coil is increased, the quantity of turns of the coil is correspondingly decreased. How to improve performance of a communication tag and an electronic device in sensing a short-haul communication signal to break through a bottleneck of short-haul communication performance is a problem that needs to be resolved.

FIG. 2 is a schematic diagram of a structure of a communication tag 20 according to an embodiment of this application. The communication tag 20 shown in FIG. 2 may be a communication tag 20 for short-haul communication.

In an example shown in FIG. 2, the communication tag 20 may include a circuit board 21. A line on the circuit board 21 may be configured to form a coil. In another example, the circuit board 21 may alternatively be replaced with another component that may form a coil, for example, a coil formed by winding a copper wire.

The communication tag 20 may further include a chip 22 disposed on the circuit board 21. The chip 22 may include a first port 2201 and a second port 2202 with opposite polarities. To be specific, when the polarity (or potential) of the first port 2201 is positive, the polarity of the second port 2202 is negative. When the polarity of the first port 2201 is negative, the polarity of the second port 2202 is positive. The first port 2201 and the second port 2202 may be respectively electrically connected to two ends of the coil, so that the first port 2201 of the chip 22, the coil, and the second port 2202 of the chip 22 may form a current loop.

The circuit board 21 may be a double-sided board. The circuit board 21 may include a first conducting layer 210 and a second conducting layer 220. When the first conducting layer 210 is observed in a direction perpendicular to the first conducting layer 210, a line of the first conducting layer 210 may be observed. In FIG. 2, the line of the first conducting layer 210 is represented by a solid outline and a pattern filled with white spots on a black background. Based on an observation direction shown in FIG. 2, the first conducting layer 210 blocks a line of the second conducting layer 220. Therefore, in FIG. 2, the line of the second conducting layer 220 is represented by a dashed outline and a pattern filled with black spots on a white background.

When the communication tag 20 is observed along an A-A cross section in FIG. 2, an A-A sectional view shown in FIG. 2 may be obtained. The first conducting layer 210 and the second conducting layer 220 may be respectively located on two sides of the circuit board 21 relative to a thickness direction of the circuit board 21.

A first coil 23 is formed on the first conducting layer 210. A second coil 24 is formed on the second conducting layer 220. The first coil 23 and the second coil 24 may be disposed in an intersecting (namely, partially overlapping or incompletely overlapping) manner. To be specific, a first part of the first coil 23 may be disposed in alignment with a first part of the second coil 24, and a second part of the first coil 23 and a second part of the second coil 24 may be disposed in a staggered manner. In some embodiments, projection that is of the chip 22 and that is on the circuit board 21 may be located outside the first coil 23 and the second coil 24.

In some embodiments, some lines of the first coil 23 may be disposed in alignment with some lines of the second coil 24.

In some other embodiments, projection that is of the first part of the first coil 23 and that is on the second conducting layer 220 may be located in an area enclosed by the second coil 24. Projection that is of the second part of the first coil 23 and that is on the second conducting layer 220 may not intersect the second coil 24. Projection that is of a third part of the first coil 23 and that is on the second conducting layer 220 may be aligned with a part of the second coil 24. The area enclosed by the second coil 24 may be an area enclosed by an inner ring of the second coil 24.

In some other embodiments, projection that is of the first part of the second coil 24 and that is on the first conducting layer 210 may be located in an area enclosed by the first coil 23. Projection that is of the second part of the second coil 24 and that is on the first conducting layer 210 may not intersect the first coil 23. Projection that is of a third part of the second coil 24 and that is on the first conducting layer 210 may be aligned with a part of the first coil 23. The area enclosed by the first coil 23 may be an area enclosed by an inner ring of the first coil 23.

In an example, a percentage of a sensing area of an intersection region of the first coil 23 and the second coil 24 to a sensing area of the first coil 23 may be a %. To be specific, a project area that is of the first part aligned with the second coil 24 of the first coil 23 and that is on the first conducting layer 210 is $b_1$, a total project area that is of the first coil 23 and that is on the first conducting layer 210 is $b_2$, and a ratio of $b_1/b_2$ may be a %. A value of a % may be from 5% to 95%. Optionally, the value of a % may be from 15% to 70%. In an example, the value of a % may be from 20% to 50%. Further, the value of a % may be from 25% to 40%. Still further, the value of a % may be from 30% to 35%.

The first coil 23 and the second coil 24 may form currents in a same direction (for example, a clockwise direction or a counter-clockwise direction), to form magnetic fields in a same direction. Therefore, a magnetic field generated in a region of the first part of the first coil 23 may be superimposed with a magnetic field generated in a region of the first part of the second coil 24. The intersection region of the first coil 23 and the second coil 24 may correspond to a central sensing region of the communication tag 20. Therefore, this helps increase a magnetic flux of a magnetic field generated in the central sensing region of the communication tag 20.

In addition, a magnetic flux of a magnetic field generated at a periphery of a coil is usually less than a magnetic flux of a magnetic field generated at a center of the coil. Therefore, a superimposed magnetic flux of a magnetic field generated at a periphery of the first coil 23 and a magnetic field generated at a periphery of the second coil 24 may be little different from a magnetic flux of a magnetic field generated at a center of the first coil 23 or the second coil 24. This helps improve uniformity of a magnetic flux of a magnetic field generated by the communication tag 23. Therefore, the solution provided in this embodiment of this application helps improve sensing performance of the communication tag 20.

The following describes an electrical connection relationship between the first coil 23 and the chip 22, and an electrical connection relationship between the second coil 24 and the chip 22.

As shown in FIG. 2, the chip 22 may be disposed on a side that is of the circuit board 21 and that is close to the first conducting layer 210. The first port 2201 and the second port 2202 of the chip 22 may be located on two sides of the chip 22. The chip 22, the first conducting layer 210, and the second conducting layer 220 may form a coil feeding circuit 29. In some embodiments, the coil feeding circuit 29 may be located outside the region enclosed by the first coil 23 and outside the region enclosed by the second coil 24.

The coil feeding circuit 29 may include a feeding network that is in the circuit board 21 and that is configured to feed the first coil 23 and the second coil 24. The coil feeding circuit 29 may include a feeding end 291, a feeding end 292, a feeding end 293, and a feeding end 294.

The feeding end 291 and the feeding end 292 may be located at the first conducting layer 210. The feeding end 291 may be electrically connected to the first port 2201 of the chip 22. The feeding end 292 may be electrically connected to the second port 2202 of the chip 22. The feeding end 293 and the feeding end 294 may be located at the second conducting layer 220. The feeding end 293 may be electrically connected to the second port 2202 of the chip 22 by using a through hole that is electrically connected between the first conducting layer 210 and the second conducting layer 220. The feeding end 294 may be electrically connected to the first port 2201 of the chip 22 by using a through hole that is electrically connected between the first conducting layer 210 and the second conducting layer 220.

The feeding end 291 may be disposed opposite to the feeding end 293, and polarities of the feeding end 291 and the feeding end 293 may be opposite. The first coil 23 is electrically connected between the feeding end 291 and the feeding end 293, so that the coil feeding circuit 29 may feed the first coil 23.

The feeding end 292 may be disposed opposite to the feeding end 294, and polarities of the feeding end 292 and the feeding end 294 may be opposite. The second coil 24 is electrically connected between the feeding end 292 and the feeding end 294, so that the coil feeding circuit 29 may feed the second coil 24.

The polarities of the feeding end 291 and the feeding end 292 may be opposite, and the polarities of the feeding end 293 and the feeding end 294 may be opposite. Therefore, the coil feeding circuit 29 may form two 180° reverse differential ports on the two sides of the chip 22, to feed the first coil 23 and the second coil 24. This helps the first coil 23 and the second coil 24 emit magnetic fields in a same direction.

The coil feeding circuit 29 may include a first line 211 and a second line 212. The first line 211 and the second line 212 may be lines on the first conducting layer 210. The first port 2201 of the chip 22 may be electrically connected to the first line 211. An end that is of the first line 211 and that is away from the first port 2201 may be the feeding end 291 of the coil feeding circuit 29. The second port 2202 of the chip 22 may be electrically connected to the second line 212. An end that is of the second line 212 and that is away from the second port 2202 may be the feeding end 292 of the coil feeding circuit 29.

The first coil 23 may include a first end 231 and a second end 232. The first end 231 of the first coil 23 may be located at an outer ring of the first coil 23. The second end 232 of the first coil 23 may be located at the inner ring of the first coil 23.

The first end 231 of the first coil 23 may be electrically connected to the first port 2201 of the chip 22 by using the first line 211 of the first conducting layer 210.

As shown in FIG. 2, the coil feeding circuit 29 may further include a third line 221. The third line 221 may be a line on the second conducting layer 220. As shown in the A-A sectional view in FIG. 2, the circuit board 21 may further include a through hole 251 electrically connected between the first coil 23 of the first conducting layer 210 and the third line 221 of the second conducting layer 220. The second end 232 of the first coil 23 may be electrically connected to the third line 221 of the second conducting layer 220 by using the through hole 251.

Figure 4:
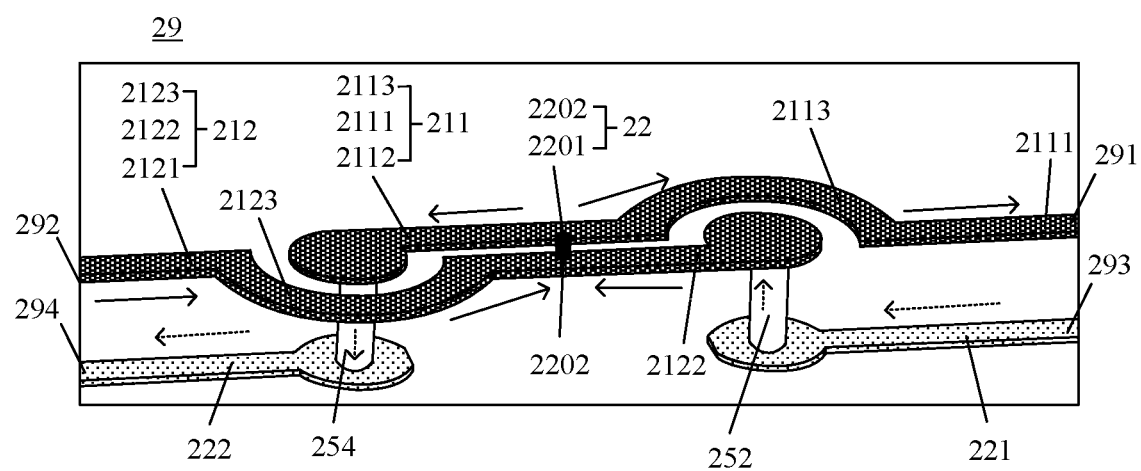
FIG. 4 is a schematic diagram of a structure of another balun according to this application.

With reference to FIG. 2 and FIG. 3, or with reference to FIG. 2 and FIG. 4, the circuit board 21 may further include a through hole 252 electrically connected between the second line 212 of the first conducting layer 210 and the third line 221 of the second conducting layer 220. That is, an end that is of the third line 221 and that is away from the feeding end 293 may be connected to the through hole 252. The third line 221 of the second conducting layer 220 may be electrically connected to the second port 2202 of the chip 22 by using the through hole 252 and the second line 212 of the first conducting layer 210.

The second coil 24 may include a second end 242 and a first end 241. The second end 242 of the second coil 24 may be located at an outer ring of the second coil 24. The first end 241 of the second coil 24 may be located at the inner ring of the second coil 24.

The third line 221 may be disposed opposite to the first line 211 on the first conducting layer 210. For example, a spacing between a part of the third line 221 and a part of the first line 211 is less than a preset spacing. In this application, the preset spacing may be, for example, 10 mm, 5 mm, 2 mm, or 1 mm, or may be smaller, for example, 0.5 mm, 0.2 mm, or 0.1 mm. The preset spacing may be determined based on an overall size of the communication tag. For another example, projection that is of the third line 221 and that is on the first conducting layer 210 intersects or overlaps the first line 211. For another example, projection that is of the first line 211 and that is on the second conducting layer 220 intersects or overlaps the third line 221. For another example, the first line 211 may be disposed at least partially in alignment with the third line 221.

As shown in FIG. 2, the coil feeding circuit 29 may further include a fourth line 222. The fourth line 222 may be a line on the second conducting layer 220. The second end 242 of the second coil 24 may be electrically connected to the fourth line 222 of the second conducting layer 220. As shown in the A-A sectional view in FIG. 2, the circuit board 21 may further include a through hole 253 electrically connected between the first line 211 of the first conducting layer 210 and the fourth line 222 of the second conducting layer 220. The fourth line 222 of the second conducting layer 220 may be electrically connected to the first port 2201 of the chip 22 by using the through hole 253 and the first line 211 of the first conducting layer 210.

With reference to FIG. 2 and FIG. 3, or with reference to FIG. 2 and FIG. 4, the circuit board 21 may further include a through hole 254 electrically connected between the second coil 24 of the second conducting layer 220 and the second line 212 of the first conducting layer 210. That is, an end that is of the fourth line 222 and that is away from the feeding end 294 may be connected to the through hole 254. The first end 241 of the second coil 24 may be electrically connected to the second port 2202 of the chip 22 by using the through hole 254 and the second line 212 of the first conducting layer 210.

The fourth line 222 may be disposed opposite to the second line 212 on the first conducting layer 210. For example, a spacing between a part of the fourth line 222 and a part of the second line 212 is less than the preset spacing. For another example, projection that is of the fourth line 222 and that is on the first conducting layer 210 intersects or overlaps the second line 212. For another example, projection that is of the second line 212 and that is on the second conducting layer 220 intersects or overlaps the fourth line 222. For another example, the fourth line 222 may be disposed at least partially in alignment with the second line 212.

Solid arrows in FIG. 2 to FIG. 4 further show a diagram of a possible current direction of the first coil 23. Dashed arrows in FIG. 2 to FIG. 4 further show a diagram of a possible current direction of the second coil 24.

It is assumed that an electrical signal from the chip 22 flows out of the first port 2201 of the chip 22, and flows from the first end 231 of the first coil 23 into the first coil 23 through the first line 211 of the first conducting layer 210. The first coil 23 may be wound from outside to inside in the clockwise direction. Therefore, the first coil 23 may form a current in the clockwise direction, and generate a magnetic field perpendicular to the first coil 23. A current conducted on the first coil 23 may flow out of the second end 232 of the first coil 23, and flow into the second port 2202 of the chip 22 through the through hole 251 and the third line 221 of the second conducting layer 220.

It is assumed that an electrical signal from the chip 22 flows out of the first port 2201 of the chip 22, and flows from the second end 242 of the second coil 24 into the second coil 24 through the fourth line 222 of the second conducting layer 220. The second coil 24 may be wound from outside to inside in the clockwise direction. Therefore, the second coil 24 may form a current in the clockwise direction, and generate a magnetic field perpendicular to the second coil 24. A current conducted on the second coil 24 may flow out of the first end 241 of the second coil 24, and flow into the second port 2202 of the chip 22 through the through hole 254 and the second line 212 of the first conducting layer 210.

To enable the first coil 23 and the second coil 24 to form the currents in the same direction, the first coil 23 and the second coil 24 may further have other possible structures.

For example, the first end 231 of the first coil 23 may be located at the inner ring of the first coil 23, and the first coil 23 is wound from outside to inside in the counter-clockwise direction. The second end 242 of the second coil 24 may be located at the outer ring of the second coil 24, and the second coil 24 is wound from outside to inside in the clockwise direction. It is assumed that a current flows out of the first port 2201 of the chip 22 and flows into the second port 2202 of the chip 22. Both the first coil 23 and the second coil 24 may form the current in the clockwise direction.

For another example, the first end 231 of the first coil 23 may be located at the outer ring of the first coil 23, and the first coil 23 is wound from outside to inside in the clockwise direction. The second end 242 of the second coil 24 may be located at the inner ring of the second coil 24, and the second coil 24 is wound from outside to inside in the counter-clockwise direction. It is assumed that a current flows out of the first port 2201 of the chip 22 and flows into the second port 2202 of the chip 22. Both the first coil 23 and the second coil 24 may form the current in the clockwise direction.

For another example, the first end 231 of the first coil 23 may be located at the inner ring of the first coil 23, and the first coil 23 is wound from outside to inside in the counter-clockwise direction. The second end 242 of the second coil 24 may be located at the inner ring of the second coil 24, and the second coil 24 is wound from outside to inside in the counter-clockwise direction. It is assumed that a current flows out of the first port 2201 of the chip 22 and flows into the second port 2202 of the chip 22. Both the first coil 23 and the second coil 24 may form the current in the clockwise direction.

For another example, the first end 231 of the first coil 23 may be located at the outer ring of the first coil 23, and the first coil 23 is wound from outside to inside in the counter-clockwise direction. The second end 242 of the second coil 24 may be located at the outer ring of the second coil 24, and the second coil 24 is wound from outside to inside in the counter-clockwise direction. It is assumed that a current flows out of the first port 2201 of the chip 22 and flows into the second port 2202 of the chip 22. Both the first coil 23 and the second coil 24 may form a current in the counter-clockwise direction.

For another example, the first end 231 of the first coil 23 may be located at the outer ring of the first coil 23, and the first coil 23 is wound from outside to inside in the counter-clockwise direction. The second end 242 of the second coil 24 may be located at the inner ring of the second coil 24, and the second coil 24 is wound from outside to inside in the clockwise direction. It is assumed that a current flows out of the first port 2201 of the chip 22 and flows into the second port 2202 of the chip 22. Both the first coil 23 and the second coil 24 may form the current in the counter-clockwise direction.

For another example, the first end 231 of the first coil 23 may be located at the inner ring of the first coil 23, and the first coil 23 is wound from outside to inside in the clockwise direction. The second end 242 of the second coil 24 may be located at the outer ring of the second coil 24, and the second coil 24 is wound from outside to inside in the counter-clockwise direction. It is assumed that a current flows out of the first port 2201 of the chip 22 and flows into the second port 2202 of the chip 22. Both the first coil 23 and the second coil 24 may form a current in the counter-clockwise direction.

For another example, the first end 231 of the first coil 23 may be located at the inner ring of the first coil 23, and the first coil 23 is wound from outside to inside in the clockwise direction. The second end 242 of the second coil 24 may be located at the inner ring of the second coil 24, and the second coil 24 is wound from outside to inside in the clockwise direction. It is assumed that a current flows out of the first port 2201 of the chip 22 and flows into the second port 2202 of the chip 22. Both the first coil 23 and the second coil 24 may form the current in the counter-clockwise direction.

FIG. 3 is a schematic diagram of a structure of a coil feeding circuit 29 according to an embodiment of this application. For a local region in which the chip 22 in FIG. 2 is located, with reference to FIG. 3, the following describes an electrical connection relationship between a first coil 23 and the chip 22 and an electrical connection relationship between a second coil 24 and the chip 22. The structure shown in FIG. 3 may be a balun structure.

A first end 231 of the first coil 23 may be located on a side that is of the chip 22 and that is close to a first port 2201. A first line 211 of a first conducting layer 210 may extend from the first end 231 of the first coil 23 to the first port 2201 of the chip 22. A second end 232 of the first coil 23 may be located on the side that is of the chip 22 and that is close to the first port 2201. Because the first port 2201 and a second port 2202 of the chip 22 may be located on two sides of the chip 22, a third line 221 of a second conducting layer 220 may extend from the side that is of the chip 22 and that is close to the first port 2201 to a side that is of the chip 22 and that is close to the second port 2202. Because the second port 2202 of the chip 22 is electrically connected to the third line 221 of the second conducting layer 220 by using a through hole 252, the through hole 252 may be, for example, located on the side that is of the chip 22 and that is close to the second port 2202. In the example shown in FIG. 3, a part of a second line 212 may extend from the second port 2202 of the chip 22 to the through hole 252, and another part may extend from the second port 2202 of the chip 22 to a first end 241 of a second coil 24.

A second end 242 of the second coil 24 may be located on the side that is of the chip 22 and that is close to the second port 2202. Because the first port 2201 and the second port 2202 of the chip 22 may be located on the two sides of the chip 22, a fourth line 222 of the second conducting layer 220 may extend from the side that is of the chip 22 and that is close to the first port 2201 to the side that is of the chip 22 and that is close to the second port 2202. Because the first port 2201 of the chip 22 is electrically connected to the fourth line 222 of the second conducting layer 220 by using a through hole 254, the through hole 254 may be, for example, located on the side that is of the chip 22 and that is close to the first port 2201. In the example shown in FIG. 3, a part of the first line 211 may extend from the first port 2201 of the chip 22 to the through hole 254, and another part may extend from the first port 2201 of the chip 22 to the second end 242 of the second coil 24. The first end 241 of the second coil 24 may be located on the side that is of the chip 22 and that is close to the second port 2202. The second line 212 of the first conducting layer 210 may extend from the first end 241 of the second coil 24 to the second port 2202 of the chip 22.

The first line 211 of the first conducting layer 210 may extend from a feeding end 291 to the first port 2201 of the chip 22. The second line 212 of the first conducting layer 210 may extend from the second port 2202 of the chip 22 to a feeding end 292. The first line 211 and the second line 212 may be located on the two sides of the chip 22. The through hole 252 may be located on a side that is of the chip 22 and that is close to the second line 212. The through hole 254 may be located on a side that is of the chip 22 and that is close to the first line 211.

As shown in FIG. 3, the through hole 252 may be located near the second port 2202 of the chip 22. For example, the through hole 252 may be located on the side that is of the chip 22 and that is close to the second port 2202. For another example, the through hole 252 and the second end 232 of the first coil 23 may be located on a same side of the chip 22. The through hole 254 may be located near the first port 2201 of the chip 22. For example, the through hole 254 may be located on the side that is of the chip 22 and that is close to the first port 2201. For another example, the through hole 254 and the second end 242 of the second coil 24 may be located on a same side of the chip 22.

The third line 221 of the second conducting layer 220 may be electrically connected to the second port 2202 of the chip 22 by using the second line 212 and the through hole 252. A first part 2211 of the third line 221 may extend from a feeding end 293 to a position near the through hole 254. A second part 2212 of the third line 221 may extend from the through hole 252 to a position near the through hole 254. A third part 2213 of the third line 221 may be connected between the first part 2211 and the second part 2212 of the third line 221, and bypass or avoid the through hole 254.

The first part 2211 of the third line 221 may be disposed close to the first line 211. For example, the first part 2211 of the third line 221 may be disposed in alignment with the first line 211. To be specific, a spacing distance between projection that is of the first part 2211 of the third line 221 and that is on the first conducting layer 210 and the first line 211 may be less than the preset spacing, or projection that is of the first part 2211 of the third line 221 and that is on the first conducting layer 210 may intersect the first line 211, or projection that is of the first part 2211 of the third line 221 and that is on the first conducting layer 210 may overlap the first line 211.

Because a current direction of the first line 211 may be approximately opposite to a current direction of the first part 2211 of the third line 221, a magnetic field generated by the first part 2211 of the third line 221 may counteract a part of a magnetic field generated by the first line 211. This helps reduce impact of a feeding line of a coil on a magnetic field generated by the coil.

The second part 2212 of the third line 221 may be disposed close to the second line 212 or the first line 211. For example, the second part 2212 of the third line 221 may be disposed in alignment with the second line 212 or the first line 211. To be specific, a spacing distance between projection that is of the second part 2212 of the third line 221 and that is on the first conducting layer 210 and the second line 212 or the first line 211 may be less than the preset spacing, or the projection that is of the second part 2212 of the third line 221 and that is on the first conducting layer 210 may intersect the second line 212 or the first line 211, or the projection that is of the second part 2212 of the third line 221 and that is on the first conducting layer 210 may overlay the second line 212 or the first line 211.

Because a current direction of the second line 212 or the first line 211 may be approximately opposite to a current direction of the second part 2212 of the third line 221, a magnetic field generated by the second part 2212 of the third line 221 may counteract a part of a magnetic field generated by the second line 212. This helps reduce impact of a feeding line of a coil on a magnetic field generated by the coil.

The fourth line 222 of the second conducting layer 220 may be electrically connected to the first port 2201 of the chip 22 by using the through hole 254 and the first line 211 of the first conducting layer 210. A first part 2221 of the fourth line 222 may extend from a feeding end 294 to a position near the through hole 252. A second part 2222 of the fourth line 222 may extend from the through hole 254 to a position near the through hole 252. A third part 2223 of the fourth line 222 may be connected between the first part 2221 and the second part 2222 of the third line 221, and bypass or avoid the through hole 252.

The first part 2221 of the fourth line 222 may be disposed close to the second line 212. For example, the first part 2221 of the fourth line 222 may be disposed in alignment with the second line 212. To be specific, a spacing distance between projection that is of the first part 2221 of the fourth line 222 and that is on the first conducting layer 210 and the second line 212 may be less than a preset distance, or projection that is of the first part 2221 of the fourth line 222 and that is on the first conducting layer 210 may intersect the second line 212, or projection that is of the first part 2221 of the fourth line 222 and that is on the first conducting layer 210 may overlap the second line 212.

Because a current direction of the second line 212 may be approximately opposite to a current direction of the first part 2221 of the fourth line 222, a magnetic field generated by the first part 2221 of the fourth line 222 may counteract a part of the magnetic field generated by the second line 212. This helps reduce impact of a feeding line of a coil on a magnetic field generated by the coil.

The second part 2222 of the fourth line 222 may be disposed close to the first line 211 or the second line 212. For example, the second part 2222 of the fourth line 222 may be disposed in alignment with the first line 211 or the second line 212. To be specific, a spacing distance between projection that is of the second part 2222 of the fourth line 222 and that is on the first conducting layer 210 and the first line 211 or the second line 212 may be less than a preset distance, or the projection that is of the second part 2222 of the fourth line 222 and that is on the first conducting layer 210 may intersect the first line 211 or the second line 212, or the projection that is of the second part 2222 of the fourth line 222 and that is on the first conducting layer 210 may overlap the first line 211 or the second line 212.

Because the current direction of the first line 211 may be approximately opposite to a current direction of the second part 2222 of the fourth line 222, a magnetic field generated by the second part 2222 of the fourth line 222 may counteract a part of the magnetic field generated by the first line 211. This helps reduce impact of a feeding line of a coil on a magnetic field generated by the coil.

FIG. 4 is a schematic diagram of a structure of a coil feeding circuit 29 according to an embodiment of this application. For a local region in which the chip 22 in FIG. 2 is located, with reference to FIG. 4, the following describes an electrical connection relationship between a first coil 23 and the chip 22 and an electrical connection relationship between a second coil 24 and the chip 22. The structure shown in FIG. 4 may be another balun structure.

In the example shown in FIG. 4, a first end 231 and a second end 232 of the first coil 23 may be located on a same side of the chip 22. A second end 242 and a first end 241 of the second coil 24 may be located on a same side of the chip 22. The first end 231 of the first coil 23 and the second end 242 of the second coil 24 may be respectively located on two sides of the chip 22. The two sides may be different from a side that is of the chip 22 and that is close to a first port 2201 and a side that is of the chip 22 and that is close to a second port 2202.

FIG. 4 is used as an example. The chip 22 may have four sides: a first side, a second side, a third side, and a fourth side. For example, the first side, the second side, the third side, and the fourth side may be an upper side, a right side, a lower side, and a left side of the chip 22. The first side may be the side that is of the chip 22 and that is close to the first port 2201. The first end 231 and the second end 232 of the first coil 23 may be located on the second side of the chip 22. The third side may be the side that is of the chip 22 and that is close to the second port 2202. The second end 242 and the first end 241 of the second coil 24 may be located on the fourth side of the chip 22. In another possible example, the first end 231 and the second end 232 of the first coil 23 may alternatively be located on the side that is of the chip 22 and that is close to the first port 2201 or the side that is of the chip 22 and that is close to the second port 2202. Similarly, the second end 242 and the first end 241 of the second coil 24 may alternatively be located on the side that is of the chip 22 and that is close to the first port 2201 or the side that is of the chip 22 and that is close to the second port 2202.

A third line 221 of a second conducting layer 220 may extend from a feeding end 293 to a through hole 252. A fourth line 221 of the second conducting layer 220 may extend from a through hole 254 to a feeding end 294. The third line 221 and the fourth line 221 may be located on the two sides of the chip 22. The through hole 252 may be located on a side that is of the chip 22 and that is close to the third line 221. The through hole 254 may be located on a side that is of the chip and that is close to the fourth line 221.

The third line 221 of the second conducting layer 220 may be electrically connected to the second port 2202 of the chip 22 by using the second line 212 and the through hole 252. A first part 2121 of the second line 212 may extend from a feeding end 292 to a position near the through hole 254. A second part 2122 of the second line 212 may extend from the through hole 252 to a position near the through hole 254. A third part 2123 of the second line 212 may be connected between the first part 2121 and the second part 2122 of the second line 212, and bypass or avoid the through hole 254.

A first part 2111 of a first line 211 may be disposed close to the third line 221. For example, the first part 2111 of the first line 211 may be disposed in alignment with the third line 221. For descriptions of the first part 2111 of the first line 211, refer to the foregoing descriptions of the first part 2211 of the third line 221. Because a current direction of the third line 221 may be approximately opposite to a current direction of the first part 2111 of the first line 211, a magnetic field generated by the first part 2111 of the first line 211 may counteract a part of a magnetic field generated by the third line 221. This helps reduce impact of a feeding line of a coil on a magnetic field generated by the coil.

The first part 2121 of the second line 212 may be disposed close to the fourth line 222. For example, the first part 2121 of the second line 212 may be disposed in alignment with the fourth line 222. For descriptions of the first part 2121 of the second line 212, refer to the foregoing descriptions of the first part 2221 of the fourth line 222. Because a current direction of the fourth line 222 may be approximately opposite to a current direction of the first part 2121 of the second line 212, a magnetic field generated by the first part 2121 of the second line 212 may counteract a part of a magnetic field generated by the fourth line 222. This helps reduce impact of a feeding line of a coil on a magnetic field generated by the coil.

The second part 2122 of the second line 212 may be disposed close to a second part 2112 of the first line 211. To be specific, a spacing between the second part 2122 of the second line 212 and the second part 2112 of the first line 211 may be less than the preset spacing. Because a current direction of the second part 2112 of the first line 211 may be approximately opposite to a current direction of the second part 2122 of the second line 212, a magnetic field generated by the second part 2122 of the second line 212 may counteract a part of a magnetic field generated by the second part 2112 of the first line 211. This helps reduce impact of a feeding line of a coil on a magnetic field generated by the coil.

In the embodiments shown in FIG. 2 to FIG. 4, the first conducting layer 210 may further include a line 213. The line 213 may be electrically connected to the feeding end 291 of the coil feeding circuit 29 and the first end 231 of the first coil 23. The second conducting layer 20 may further include a line 223. The line 223 may be electrically connected to the feeding end 293 of the coil feeding circuit 29 and the second end 232 of the first coil 23. The line 213 and the line 223 are disposed opposite to each other. For example, a spacing between the line 213 and the line 223 may be less than the preset spacing.

In the embodiments shown in FIG. 2 to FIG. 4, the first conducting layer 210 may further include a line 214. The line 214 may be electrically connected to the feeding end 292 of the coil feeding circuit 29 and the first end 241 of the second coil 24. The second conducting layer 20 may further include a line 224. The line 224 may be electrically connected to the feeding end 294 of the coil feeding circuit 29 and the second end 242 of the second coil 24. The line 214 and the line 224 are disposed opposite to each other. For example, a spacing between the line 214 and the line 224 may be less than the preset spacing.

Figure 5:
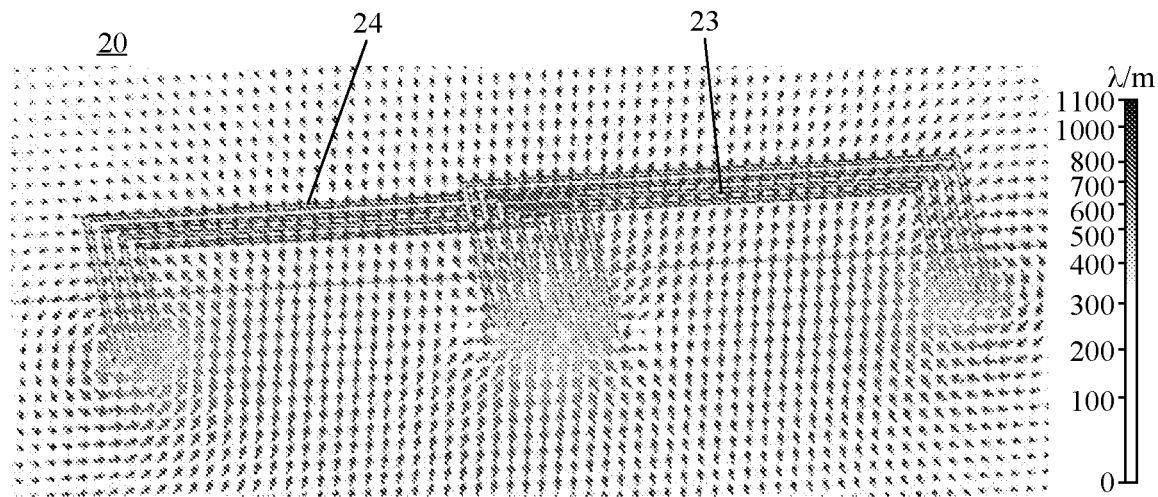
FIG. 5 is a diagram of a magnetic field direction of a communication tag according to this application.

FIG. 5 shows a diagram of magnetic field distribution of a communication tag 20 according to this application. It can be learned from FIG. 5 that a region enclosed by a first coil 23 and a second coil 24 may be an effective sensing region of the communication tag 20. In the effective sensing region of the communication tag 20, directions of magnetic fields generated by the communication tag 20 may be relatively consistent, and a magnetic flux of the magnetic field generated by the communication tag 20 may be relatively large. Therefore, the communication tag 20 can meet a communication requirement for short-haul communication.

Figure 6:
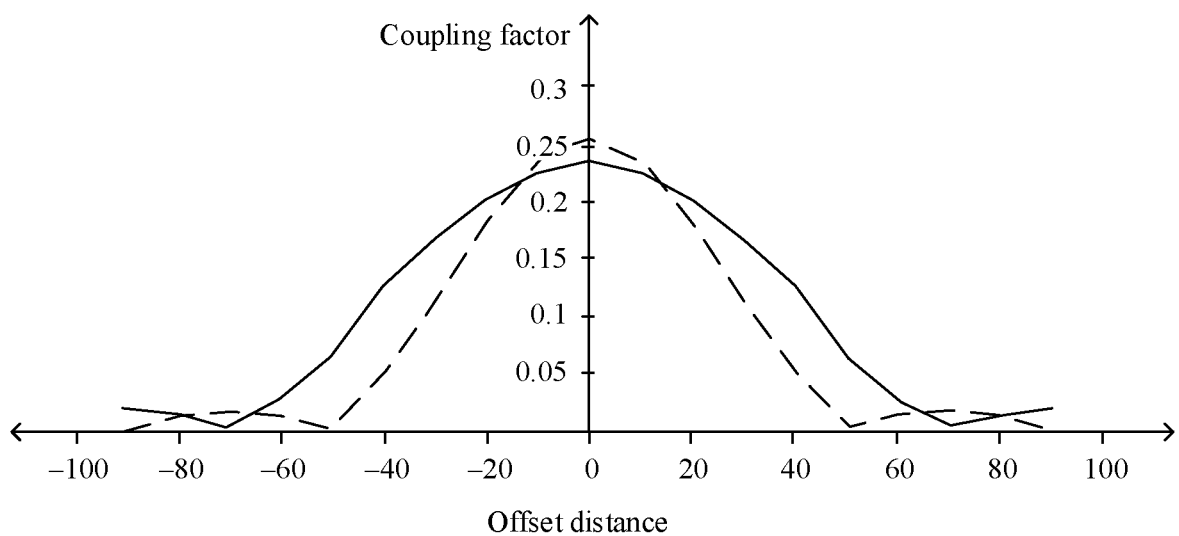
FIG. 6 is a diagram of sensing performance of a communication tag according to this application.

FIG. 6 is a schematic diagram of communication performance of a communication tag 20 according to this application. A horizontal coordinate in FIG. 6 represents an offset distance to the center of an effective sensing region of the communication tag 20. A vertical coordinate in FIG. 6 may represent a coupling factor of the communication tag 20. A solid line in FIG. 6 represents communication performance of the solution provided in this application. A dashed line in FIG. 6 represents communication performance of a communication tag 20 having a single coil.

For a specific short-haul communication frequency band, a length of a coil is usually relatively fixed. When the communication requirement is met, a sensing area that can be implemented by the single coil is relatively small. The communication tag 20 provided in this application may reach, within more offset distances, a coupling factor that meets a requirement. An amplitude of an induced magnetic field of the communication tag 20 may be relatively high when an area of the effective sensing region of the communication tag 20 is increased. Therefore, in the solution provided in this embodiment of this application, both the sensing area and the amplitude of the induced magnetic field of the communication tag 20 can be considered.

Figure 7:
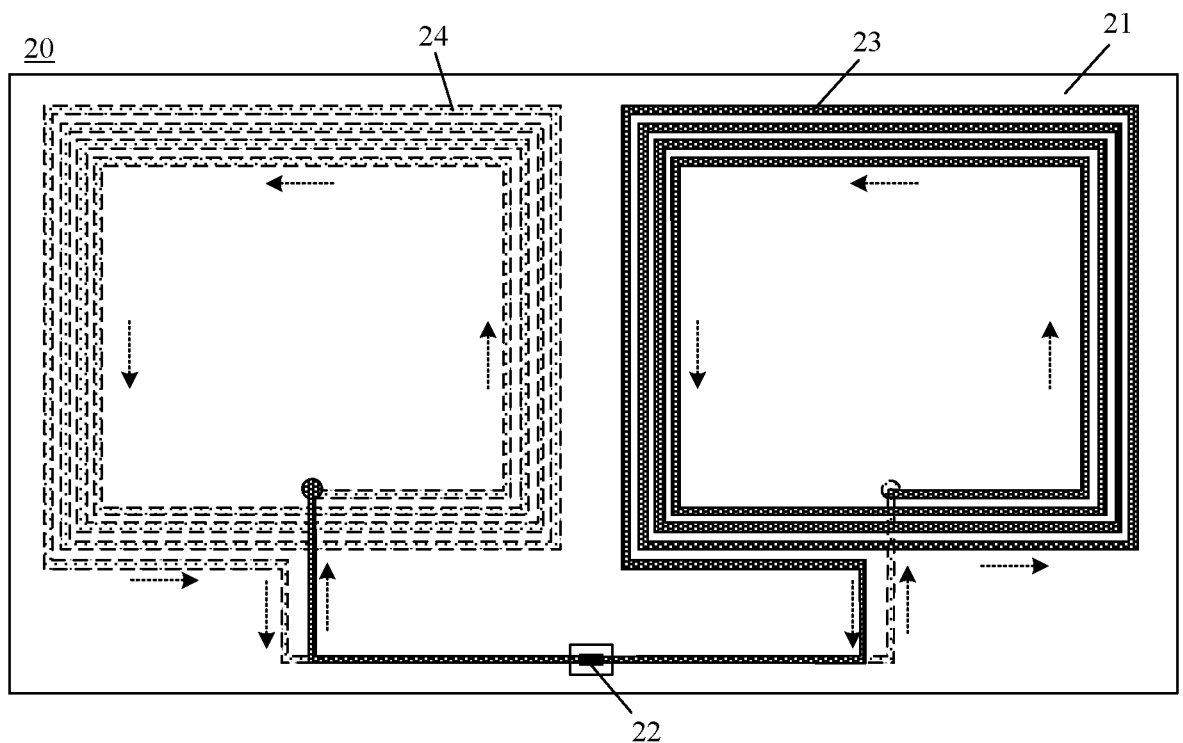
FIG. 7 is a schematic diagram of a structure of another communication tag according to this application.

FIG. 7 is a schematic diagram of a structure of another communication tag 20 according to an embodiment of this application. Similar to the communication tag 20 shown in FIG. 2, the communication tag 20 shown in FIG. 7 includes a circuit board 21 and a chip 22. A line of the circuit board 21 forms a first coil 23 and a second coil 24 of the communication tag 20. For a structure of the first coil 23 and a structure of the second coil 24, refer to the example shown in FIG. 2. For an electrical connection relationship, a structure relationship, and a position relationship between the first coil 23 and the chip 22, and an electrical connection relationship, a structure relationship, and a position relationship between the second coil 24 and the chip 22, refer to the examples shown in FIG. 2 to FIG. 4.

Slightly different from the communication tag 20 shown in FIG. 2, the first coil 23 and the second coil 24 shown in FIG. 7 do not intersect each other. To be specific, a projection region that is of the first coil 23 and that is on a second conducting layer does not intersect the second coil 24, and a projection region that is of the second coil 24 and that is on a first conducting layer does not intersect the first coil 23. Optionally, the first coil 23 and the second coil 24 may be disposed close to each other. For example, a spacing between the projection region that is of the first coil 23 and that is on the second conducting layer and the second coil 24 may be less than a preset spacing. A spacing between the projection region that is of the second coil 24 and that is on the first conducting layer and the first coil 23 may be less than the preset spacing.

Figure 8:
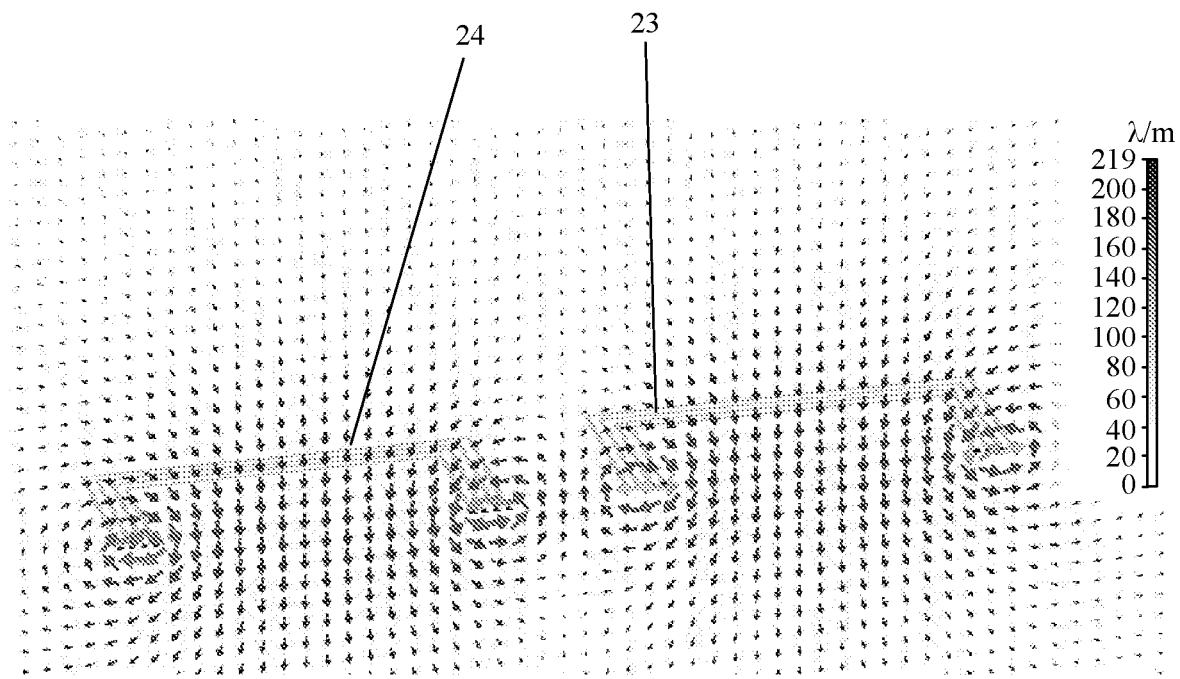
FIG. 8 is a diagram of a magnetic field direction of another communication tag according to this application.

It can be learned from the foregoing examples that the communication tag 20 in FIG. 7 may have two sensing regions that are independent of each other. The two sensing regions may respectively correspond to a sensing region of the first coil 23 and a sensing region of the second coil 24. In a region enclosed by the first coil 23, the first coil 23 may form a magnetic field in a first direction. Similarly, in a region enclosed by the second coil 24, the second coil 24 may form a magnetic field in the first direction. Therefore, in a spacing region between the first coil 23 and the second coil 24, both the first coil 23 and the second coil 24 may form a magnetic field in a second direction that is opposite to the first direction, as shown in FIG. 8. The magnetic field in the spacing region between the first coil 23 and the second coil 24 may be used. For example, the magnetic field may be used for communication, or may be used for energy transmission.

Figure 9:
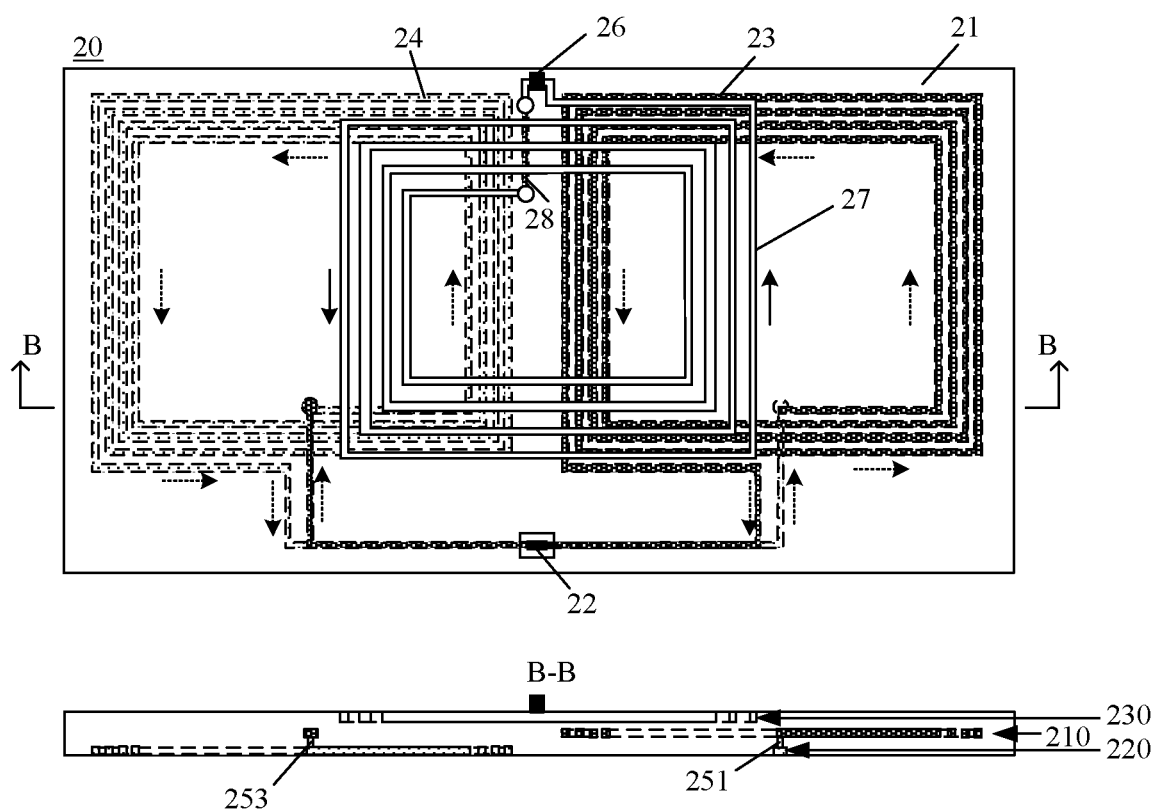
FIG. 9 is a schematic diagram of a structure of still another communication tag according to this application.

FIG. 9 is a schematic diagram of a structure of another communication tag 20 according to an embodiment of this application. When the communication tag 20 is observed along a B-B cross section in FIG. 9, a B-B sectional view shown in FIG. 9 may be obtained.

Similar to the communication tag 20 shown in FIG. 7, the communication tag 20 shown in FIG. 9 includes a circuit board 21 and a chip 22. A line of the circuit board 21 forms a first coil 23 and a second coil 24 of the communication tag 20. The first coil 23 and the second coil 24 do not intersect each other. For a structure of the first coil 23 and a structure of the second coil 24, refer to the example shown in FIG. 2. For an electrical connection relationship, a structure relationship, and a position relationship between the first coil 23 and the chip 22, and an electrical connection relationship, a structure relationship, and a position relationship between the second coil 24 and the chip 22, refer to the examples shown in FIG. 2 to FIG. 4.

Slightly different from the communication tag 20 shown in FIG. 7, the communication tag 20 shown in FIG. 9 may further include a capacitive device 26, a third coil 27, and a fifth line 28. A first end of the third coil 27 is electrically connected to a first port of the capacitive device 26. A second end of the third coil 27 is electrically connected to a second port of the capacitive device 26 by using the fifth line 28.

The capacitive device 26 may be a capacitive chip or a capacitor. For example, the capacitive chip may be an unactivated (or deactivated) chip. In some embodiments, for example, the capacitive device 26 and the chip 22 may be disposed on a same side of a third conducting layer 230. In some other embodiments, the capacitive device 26 and the chip 22 may be disposed on two sides of the circuit board 21.

One side of the third coil 27 and the first coil 23 may be disposed in an intersecting manner. The other side of the third coil 27 and the second coil 24 may be disposed in an intersecting manner. In some embodiments, projection that is of the third coil 27 and that is on a first conducting layer 210 may be located in a region enclosed by the first coil 23. Projection that is of the third coil 27 and that is on a second conducting layer 220 may be located in a region enclosed by the second coil 24. The third coil 27 may be disposed on the third conducting layer 230 of the circuit board 21. In the embodiment shown in FIG. 9, the third conducting layer 230 may be located on a side that is of the first conducting layer 210 and that is away from the second conducting layer 220.

The fifth line 28 may be disposed on another conducting layer other than the third conducting layer 230 of the circuit board 21. For example, the fifth line 28 may be disposed on the first conducting layer 210 or the second conducting layer 220. The fifth line 28 may be electrically connected to the third coil 27 by using a through hole. The fifth line 28 may be electrically connected to the capacitive device 26 by using a through hole. In the embodiment shown in FIG. 9, the fifth line 28 may be located between the first coil 23 and the second coil 24.

Figure 10:
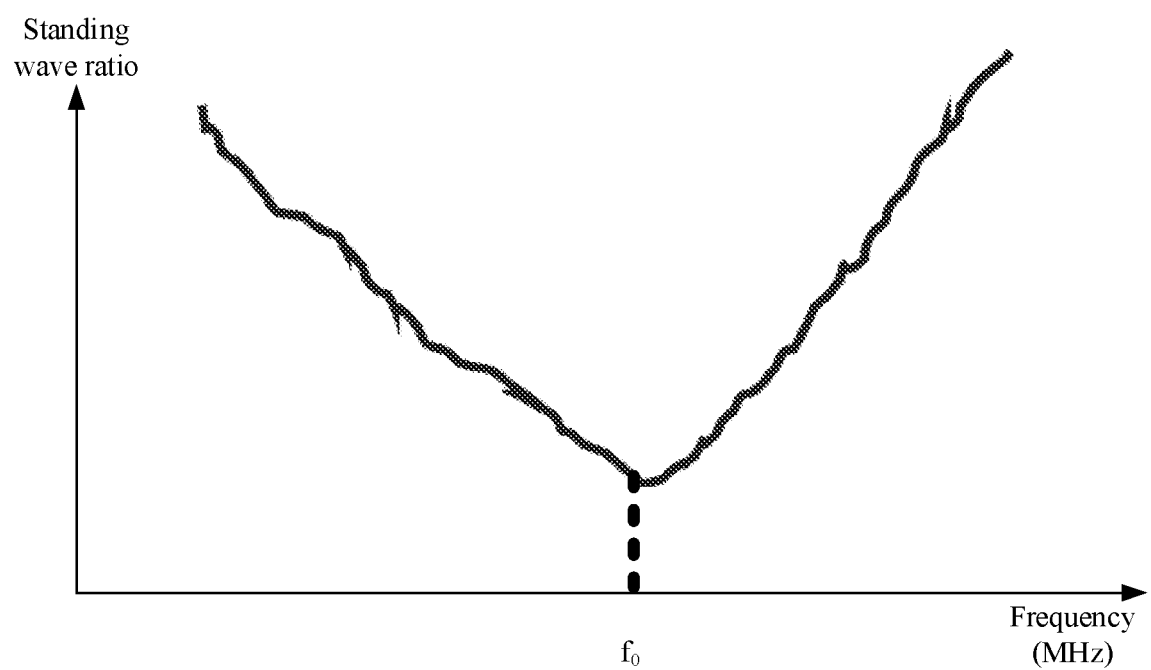
FIG. 10 is a diagram of a resonant standing wave ratio of a self-resonant coil of still another communication tag according to this application.

In the embodiment shown in FIG. 9, the first coil 23 and the second coil 24 may form a magnetic field in a first direction. A magnetic field in a second direction may be formed between the first coil 23 and the second coil 24. The third coil 27 may be induced by the first coil 23 and the second coil 24, to form a magnetic field in the first direction. Therefore, directions of magnetic fields formed by the first coil 23, the second coil 24, and the third coil 27 may be the same. The capacitive device 26 may be configured to adjust an operating frequency band of the third coil 27, so that the operating frequency band of the third coil 27 may be the same as operating frequency bands of the first coil 23 and the second coil 24. The operating frequency band of the third coil 27 may correspond to a resonance frequency $f_0$ shown in FIG. 10.

In the embodiment shown in FIG. 9, the magnetic field in the second direction formed between the first coil 23 and the second coil 24 may enable the third coil 27 to induce the magnetic field in the first direction. For example, in the embodiment shown in FIG. 9, both the first coil 23 and the second coil 24 may form a current in a counter-clockwise direction, so that the third coil 27 forms a current in the counter-clockwise direction, and the third coil 27 may form the magnetic field in the first direction. Therefore, an effective sensing region of the communication tag 20 may include a sensing region of the first coil 23, a sensing region of the second coil 24, and a sensing region between the first coil 23 and the second coil 24. Therefore, an effective sensing area of the communication tag 20 may be greater than a sum of an effective sensing area of the first coil 23 and an effective sensing area of the second coil 24.

The communication tag provided in this application may have a relatively large sensing area, and a magnetic flux of a magnetic field radiated by the communication tag may be relatively good. Therefore, in the solution provided in this embodiment of this application, both a sensing area and an amplitude of an induced magnetic field of the communication tag can be considered. This helps improve performance of the communication tag in sensing a short-haul communication signal. For example, the sensing area of the communication tag may be relatively large, and an amplitude of the magnetic flux is high. Therefore, when a user puts another device close to any effective sensing region of the communication tag, the another device may quickly complete pairing with the communication tag, or the another device may quickly complete pairing with an electronic device having the communication tag. This helps improve convenience of using the communication tag by the user.

The foregoing descriptions are merely specific implementations of this application, but the protection scope of this application is not limited thereto. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication tag, comprising:
a circuit board, wherein the circuit board comprises a first coil and a second coil, the first coil and the second coil are located on different conducting layers on the circuit board, and a current on the first coil and a current on the second coil have a same direction; and
a chip, wherein the chip is disposed on the circuit board, the chip comprises a first port and a second port, and a polarity of the first port is opposite to a polarity of the second port, wherein:
  the circuit board comprises a first conducting layer and a second conducting layer, the chip, the first conducting layer, and the second conducting layer form a coil feeding circuit, and the coil feeding circuit comprises a first feeding end, a second feeding end, a third feeding end, and a fourth feeding end;
  the first feeding end is located at the first conducting layer, and is electrically connected to the first port;
  the second feeding end is located at the first conducting layer, and is electrically connected to the second port;
  the third feeding end is located at the second conducting layer, and is disposed opposite to the first feeding end, and the third feeding end is electrically connected to the second port;
  the fourth feeding end is located at the second conducting layer, and is disposed opposite to the second feeding end, and the fourth feeding end is electrically connected to the first port; and
  the first coil is electrically connected between the first feeding end and the third feeding end, and the second coil is electrically connected between the second feeding end and the fourth feeding end.

2. The communication tag of claim 1, wherein:
the coil feeding circuit further comprises a first through hole and a second through hole;
the first through hole is electrically connected between the second feeding end on the first conducting layer and the third feeding end on the second conducting layer; and
the second through hole is electrically connected between the first feeding end on the first conducting layer and the fourth feeding end on the second conducting layer.

3. The communication tag of claim 2, wherein:
the coil feeding circuit comprises a first line, the first line is located at the first conducting layer, and the first line is electrically connected between the first port and the first feeding end;
the coil feeding circuit further comprises a second line, the second line is located at the first conducting layer, and the second line is electrically connected between the second port and the second feeding end;
the coil feeding circuit further comprises a third line, the third line is located at the second conducting layer, the third line is disposed opposite to the first line, the third line is electrically connected between the first through hole and the third feeding end, and the third line and the second port are electrically connected to the second line by using the first through hole; and
the coil feeding circuit further comprises a fourth line, the fourth line is located at the second conducting layer, the fourth line is disposed opposite to the second line, the fourth line is electrically connected between the second through hole and the fourth feeding end, and the fourth line and the first port are electrically connected to the first line by using the second through hole.

4. The communication tag of claim 3, wherein the third line and the fourth line are located on two sides of the chip, the first through hole is located on a first side of the chip close to the third line, and the second through hole is located on a second side of the chip close to the fourth line;
the first line comprises a first part, the first part of the first line is disposed opposite to the third line, the second line comprises a first part, and the first part of the second line is disposed opposite to the fourth line;
the first line further comprises a second part and a third part, an end of the second part of the first line is connected to the second through hole, and the third part of the first line is around the first through hole and is connected between the first part and the second part of the first line;
the second line further comprises a second part and a third part, an end of the second part of the second line is connected to the first through hole, and the third part of the second line is around the second through hole and is connected between the first part and the second part of the second line; and
a spacing between the second part of the first line and the second part of the second line is less than a preset spacing.

5. The communication tag of claim 4, wherein the first port of the chip is located between the second part and the third part of the first line, and the second port of the chip is located between the second part and the third part of the second line.

6. The communication tag of claim 3, wherein:
the first line and the second line are located on two sides of the chip, the first through hole is located on a first side of the chip close to the second line, and the second through hole is located on a second side of the chip close to the first line;
the third line comprises a first part, the first part of the third line is disposed opposite to the first line, the fourth line comprises a first part, and the first part of the fourth line is disposed opposite to the second line;
the third line further comprises a second part and a third part, an end of the second part of the third line is connected to the first through hole, the second part of the third line is disposed opposite to the first line or the second line, and the third part of the third line is around the second through hole and is connected between the first part and the second part of the third line; and
the fourth line further comprises a second part and a third part, an end of the second part of the fourth line is connected to the second through hole, the second part of the fourth line is disposed opposite to the first line or the second line, and the third part of the fourth line is around the first through hole and is connected between the first part and the second part of the fourth line.

7. The communication tag of claim 6, wherein the first port of the chip is connected to an end of the first line, and the second port of the chip is connected to an end of the second line.

8. The communication tag of claim 1, wherein the first conducting layer further comprises a fifth line electrically connected between the first feeding end and a first end of the first coil, the second conducting layer further comprises a sixth line electrically connected between the third feeding end and a second end of the first coil, and the fifth line is disposed opposite to the sixth line.

9. The communication tag of claim 1, wherein the first conducting layer further comprises a seventh line electrically connected between the second feeding end and a first end of the second coil, the second conducting layer further comprises an eighth line electrically connected between the fourth feeding end and a second end of the second coil, and the seventh line is disposed opposite to the eighth line.

10. The communication tag of claim 1, wherein the first coil and the second coil are disposed in an intersecting manner.

11. The communication tag of claim 10, wherein the first coil is located on the first conducting layer, the second coil is located on the second conducting layer, and a part of projection of the first coil on the second conducting layer is located in an area enclosed by the second coil.

12. The communication tag of claim 1, wherein:
the first coil is located on the first conducting layer, the second coil is located on the second conducting layer, and the first coil and the second coil do not intersect each other;
the circuit board further comprises a third conducting layer, the third conducting layer comprises a third coil, the third coil and the first coil are disposed in an intersecting manner, and the third coil and the second coil are disposed in an intersecting manner; and
the communication tag further comprises a capacitive device, wherein a first port of the capacitive device is electrically connected to a first end of the third coil, and a second port of the capacitive device is electrically connected to a second end of the third coil.

13. The communication tag of claim 12, wherein a first part of projection of the third coil on the first conducting layer is located in an area enclosed by the first coil, and a second part of projection of the third coil on the second conducting layer is located in an area enclosed by the second coil.

14. The communication tag of claim 12, wherein the chip and the capacitive device are disposed on a same side of the third conducting layer.

15. The communication tag of claim 1, wherein projection of the chip on the circuit board is located outside the first coil and the second coil.

16. An electronic device, comprising a communication tag, wherein the communication tag comprises:
a circuit board, wherein the circuit board comprises a first coil and a second coil, the first coil and the second coil are located on different conducting layers on the circuit board, and a current on the first coil and a current on the second coil have a same direction; and
a chip, wherein the chip is disposed on the circuit board, the chip comprises a first port and a second port, and a polarity of the first port is opposite to a polarity of the second port, wherein:
the circuit board comprises a first conducting layer and a second conducting layer, the chip, the first conducting layer, and the second conducting layer form a coil feeding circuit, and the coil feeding circuit comprises a first feeding end, a second feeding end, a third feeding end, and a fourth feeding end;
the first feeding end is located at the first conducting layer, and is electrically connected to the first port;
the second feeding end is located at the first conducting layer, and is electrically connected to the second port;
the third feeding end is located at the second conducting layer, and is disposed opposite to the first feeding end, and the third feeding end is electrically connected to the second port;
the fourth feeding end is located at the second conducting layer, and is disposed opposite to the second feeding end, and the fourth feeding end is electrically connected to the first port; and
the first coil is electrically connected between the first feeding end and the third feeding end, and the second coil is electrically connected between the second feeding end and the fourth feeding end.

17. The electronic device of claim 16, wherein:
the coil feeding circuit further comprises a first through hole and a second through hole;
the first through hole is electrically connected between the second feeding end on the first conducting layer and the third feeding end on the second conducting layer; and
the second through hole is electrically connected between the first feeding end on the first conducting layer and the fourth feeding end on the second conducting layer.

18. The electronic device of claim 17, wherein:
the coil feeding circuit comprises a first line, the first line is located at the first conducting layer, and the first line is electrically connected between the first port and the first feeding end;
the coil feeding circuit further comprises a second line, the second line is located at the first conducting layer, and the second line is electrically connected between the second port and the second feeding end;
the coil feeding circuit further comprises a third line, the third line is located at the second conducting layer, the third line is disposed opposite to the first line, the third line is electrically connected between the first through hole and the third feeding end, and the third line and the second port are electrically connected to the second line by using the first through hole; and
the coil feeding circuit further comprises a fourth line, the fourth line is located at the second conducting layer, the fourth line is disposed opposite to the second line, the fourth line is electrically connected between the second through hole and the fourth feeding end, and the fourth line and the first port are electrically connected to the first line by using the second through hole.

19. The electronic device of claim 18, wherein:
the third line and the fourth line are located on two sides of the chip, the first through hole is located on a first side of the chip close to the third line, and the second through hole is located on a second side of the chip close to the fourth line;
the first line comprises a first part, the first part of the first line is disposed opposite to the third line, the second line comprises a first part, and the first part of the second line is disposed opposite to the fourth line;
the first line further comprises a second part and a third part, one end of the second part of the first line is connected to the second through hole, and the third part of the first line is around the first through hole and is connected between the first part and the second part of the first line;
the second line further comprises a second part and a third part, one end of the second part of the second line is connected to the first through hole, and the third part of the second line is around the second through hole and is connected between the first part and the second part of the second line; and
a spacing between the second part of the first line and the second part of the second line is less than a preset spacing.

20. The electronic device of claim 19, wherein the first port of the chip is located between the second part and the third part of the first line, and the second port of the chip is located between the second part and the third part of the second line.

* * * * *

UNITED STATES PATENT AND TRADEMARK OFFICE
CERTIFICATE OF CORRECTION

| | | |
|---|---|---|
| PATENT NO. | : 12,299,517 B2 | Page 1 of 1 |
| APPLICATION NO. | : 18/695334 | |
| DATED | : May 13, 2025 | |
| INVENTOR(S) | : Yunpeng Shen et al. | |

It is certified that error appears in the above-identified patent and that said Letters Patent is hereby corrected as shown below:

On the Title Page

In Column 1 item (73) (Assignee), In Line 1, Delete "Ltd." and insert -- Ltd., Shenzhen --.

Signed and Sealed this
Thirtieth Day of December, 2025

John A. Squires
*Director of the United States Patent and Trademark Office*